July 20, 1937.   F. W. MORLEY   2,087,776
HEATING SYSTEM
Filed March 6, 1936
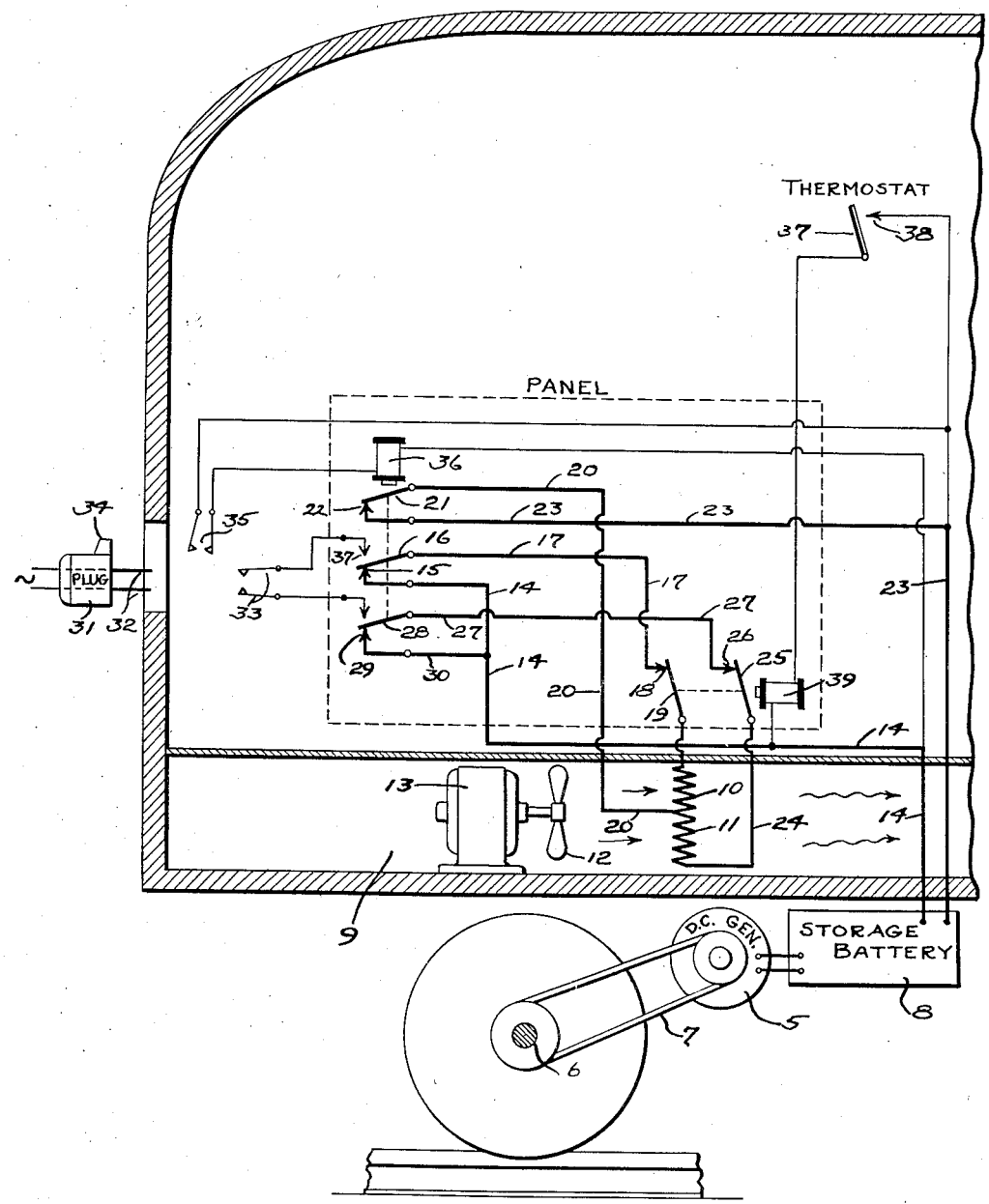
Inventor
FRANK W. MORLEY
by Robert T. Palmer
Attorney Patented July 20, 1937

2,087,776

UNITED STATES PATENT OFFICE 2,087,776

HEATING SYSTEM

Frank W. Morley, Westwood, Mass., assignor to B. F. Sturtevant Company, Inc., Boston, Mass.

Application March 6, 1936, Serial No. 67,488

4 Claims. (Cl. 219—20)

This invention relates to heating systems for passenger vehicles and relates more particularly to heating systems for railroad passenger cars.

Many railroad lines prefer to heat their passenger cars electrically, in some cases, using an axle driven, 110 volt, direct current generator for supplying the electrical energy. In the stations, however, the electrical energy is usually supplied from 220 volt alternating current mains. To operate the system in the cars there have been used motor generator sets operated from 220 volts A. C. for supplying the desired 110 volts D. C.

According to this invention, 110 volt D. C. apparatus which can be automatically operated from 220 volts A. C. is provided, it only being necessary to plug in the wayside connection for the system to operate from 220 volts A. C.

An object of the invention is to enable electrical apparatus to be operated from a relatively low or from relatively high voltage sources.

Another object of the invention is to enable an electric heating system to be operated from 110 volts D. C. or 220 volts A. C.

Another object of the invention is to provide for electrical apparatus normally energized from an electrical source, automatic switching mechanism operated upon connection to an electrical source having different characteristics, for adapting the apparatus to be operated therefrom.

Other objects of the invention will be apparent from the following description taken together with the drawing.

The invention will now be described with reference to the drawing which illustrates one embodiment of the invention in a heating system for a railroad passenger car.

The 110 volt D. C. generator 5 is driven from the car axle 6 by the belt 7 and charges at normal car speeds, the 110 volt storage battery 8.

Mounted within the air passageway 9 are the two resistor heating elements 10 and 11 which may be arranged as one element with a midpoint tap. The air to be heated which may be fresh and recirculated air is moved by the fan 12 over the elements 10 and 11 and discharged into the passenger space in any convenient manner. The fan 12 is driven by the motor 13 which may be energized from the battery 8.

Normally during movement of the car, the resistor element 10 is energized from the battery 8 through a circuit including the wire 14, the contact 15, the switch arm 16, the wire 17, the contacts 18, the switch arm 19, the heating element 10, the wire 20, the switch arm 21, the contact 22, the wire 23 and the battery 8. At the same time the resistor element 11 is energized from the battery 8 through a circuit including the wire 24, the switch arm 25, the contact 26, the wire 27, the switch arm 28, the contact 29, the wire 30, the wire 14, the battery 8, the wire 23, the contact 22, the switch arm 21, the wire 20, and the element 10. Each of the elements 10 and 11 thus receives 110 volt current from the battery 8.

When the car is at a station, the wayside plug 31, connected to a 220 volt A. C. station supply source, is inserted into an outlet so that its two supply prongs 32 rest against the two supply contacts 33. When this is done, the extension 34 on the plug 31, closes the contacts 35 in circuit with the winding of the solenoid 36 and the battery 8. This causes the solenoid 36 to become energized and to pull up the switch arms 21, 16 and 28 causing them to leave the contacts 22, 15 and 29 respectively and thus open the two previously described circuits including the elements 10 and 11, and the battery 8.

The switch arm 16 then rests against the contact 37 and the switch arm 28 then rests against the contact 38. This closes a circuit, including the 220 volt A. C. upper supply prong 32, the upper supply contact 33, the contact 37, the switch arm 16, the wire 17, the contact 18, the switch arm 19, the two elements 10 and 11 in series relationship, the wire 24, the switch arm 25, the contact 26, the wire 27, the switch arm 28, the contact 38, the lower supply contact 33, and the lower supply prong 32 of the wayside plug 31. This causes the two resistor elements 10 and 11 to be supplied in series with 220 volts whereas they each were supplied separately with 110 volts. Thus, the resistors are at all times automatically so connected that even though the supply voltage is lowered, they continue to draw the same current and to dissipate the same quantity of heat energy.

The thermostat 37, mounted within the passenger space, controls the temperature of the air by closing, when the air has reached the desired temperature, a circuit including the control 38, the winding of the solenoid 39 and the battery 8, causing the solenoid 39 to become energized and pull up the switch arms 25 and 19 causing them to leave the contacts 26 and 18 respectively and open the circuits including the resistor elements 10 and 11.

Whereas one embodiment of the invention has been described for the purpose of illustration, it should be understood that the invention is not limited to the exact arrangements described, since many departures will suggest themselves to those skilled in the art after having had access to this disclosure.

What is claimed is:

1. A heating system for a passenger vehicle comprising an electric heater, an electric source carried by said vehicle, connected normally to said heater, means for supplying electrical energy from an external electric source having a voltage different from that of said first source, means for disconnecting said heater from said first source, and for concurrently therewith increasing its resistance and connecting it to said second source, means energized from said first source for disconnecting said heater from and for connecting said heater to, both of said sources, a thermostat exposed to conditions in the passenger space for controlling said last mentioned means, and means for passing the air to be heated over said heater and for discharging it into the passenger space of said vehicle.

2. A heating system for a passenger vehicle comprising an electric heater, a relatively low voltage axle driven generator and a battery charged thereby connected normally to said heater, wayside connections for supplying a relatively high voltage to said heater, means for plugging in said wayside connections, means automatically operative upon operation of said last mentioned means for disconnecting said heater from said battery and for increasing the resistance of said heater and for connecting it to the relatively high voltage, and means for passing the air to be heated over said heater and for discharging it into the passenger space of said car.

3. A heating system for a passenger vehicle comprising a plurality of electric heater elements, a relatively low voltage electric source carried by said vehicle, means for connecting said elements in shunt to said generator, wayside connections for supplying from an external source, electric energy with voltage a multiple of that supplied by said low voltage source, means for plugging in said connections, means adjusted by said last mentioned means for disconnecting said elements from said low voltage source and for connecting them in series to said connections, and means for passing the air to be heated over said elements and for discharging it into the passenger space of said vehicle.

4. A heating system for a passenger vehicle comprising a plurality of electric heater elements, a relatively low voltage axle driven generator, means for connecting said elements in shunt to said generator, wayside connections for supplying from an external source, electric energy with voltage a multiple of that supplied by said generator, means for plugging in said connections, means adjusted by said last mentioned means for disconnecting said generator from said elements and for connecting said elements in series to said connections, and means for passing the air to be heated over said elements and for discharging it into the passenger space of said vehicle.

FRANK W. MORLEY.